Patented May 15, 1945

2,376,027

UNITED STATES PATENT OFFICE 2,376,027

PREPARATION OF RUBBER DERIVATIVES

Frederick James Bouchard, Radford, Va., assignor to Hercules Powder Company, Wilmington, Del., a corporation of Delaware No Drawing. Application August 25, 1942,
Serial No. 456,057

7 Claims. (Cl. 260—772)

This invention relates to a process for producing an improved halogenated rubber and more particularly it relates to producing an improved bleached, halogenated rubber.

In many instances it is desirable to improve the color of chlorinated rubber or rubber-like materials without causing any substantial change in viscosity.

The preparation of chlorinated rubber and other rubber-like materials comprises subjecting a dispersion of rubber or a rubber-like, unsaturated compound to the action of chlorine until the dispersed substance ceases to be unsaturated, and removing the chlorinated product from its dispersion by precipitation or evaporation. It has now been found that the chlorination process imparts impurities to chlorinated rubber which seriously impair its color.

Now in accordance with this invention, it is possible to treat chlorinated rubber in such a manner as to obtain an improved color without substantially changing the viscosity. To accomplish these desirable results the chlorination process is carried to completion in accordance with the usual practice. The desired viscosity is obtained by any of the various methods well known to the art. After the chlorinated rubber has been removed from its solvents by precipitating the chlorinated rubber or by evaporating the solvents, the color of the chlorinated rubber is improved in accordance with the following procedure:

A hypochlorite is added to the chlorinated rubber and the two substances, preferably in the presence of an acid, are heated together until the desired light color is achieved. The hypochlorite may then be removed by adding an antichlor and washing.

Having stated in a general way the nature of this invention, the following examples are given to illustrate more clearly the nature of the process.

Example I

A batch of chlorinated rubber was prepared in accordance with the usual practice and was precipitated out of its solvents with hot water kept at a temperature of 65-80° C. by means of live steam injection. During the steam injection process, the solution was agitated in a closed tank, provided with a solvent recovery system. The chlorinated rubber recovered by this precipitation process was transferred to an agitated tub and acidified with hydrochloric acid of sufficient strength to make a solution, after sodium hypochlorite had been added, of .2% hydrochloric acid. Enough sodium hypochlorite, in the form of bleach solution, was added to to make the available chlorine content equal to 0.1% of the total weight of the bleach bath. The bleach bath, which contained about 8 parts of liquid ingredients to one part of chlorinated rubber was heated at 80° C. for one hour. The final product was then treated with 0.6% of its own weight of oxalic acid dissolved in 8 parts of water, was washed with water, and dried. The chlorinated rubber after thus being treated in accordance with this invention had a color of 6 (Hazen scale); whereas, before the bleaching treatment, it had a color of 24 (Hazen scale). The viscosity of the chlorinated rubber was substantially unchanged by the treatment, the viscosity before treatment being 26 centipoises and after treatment being 24 centipoises. The viscosities given here and elsewhere in this specification and appended claims were determined on a 20% solution of the chlorinated rubber in toluol, the measurement being made in a jacketed capillary viscometer at a temperature of 25° C.

Example II

In this example, the same procedure as described in Example I was carried out except that calcium hypochlorite was used as a bleach in place of the sodium hypochlorite. In this case, only enough hypochlorite was added to make the available chlorine equal to .05% of the weight of bleaching bath. The results of this procedure were similar to those in Example I. The viscosity was substantially unaffected by the treatment, but the color was improved from 24 (Hazen scale) to 6 (Hazen scale).

Example III

A sample of the same precipitated chlorinated rubber treated in Examples I and II was bleached in the following manner:

One part of chlorinated rubber, suspended in 8 parts of water containing 0.05% of hydrochloric acid, was subjected to the bleaching action of enough sodium hypochlorite to make the content of available chlorine in the solution equal to .08%. The acid mixture of the chlorinated rubber and the bleach was held at a temperature of 70° C. for a period of 3 hours. This treatment had slight effect on the viscosity of the chlorinated rubber, but the color was improved from 24 (Hazen scale) of the original product to 4¼ (Hazen scale).

*Example IV*

In this example, a further sample of the precipitated chlorinated rubber prepared in Example I was used. The same quantities of ingredients as were used in Example II were used here with the exception of hydrochloric acid. In this, not enough hydrochloric acid was added to completely neutralize the sodium hypochlorite so that the bleaching bath had a pH of 7.02. The color of the chlorinated rubber was improved from 24 color units on the Hazen scale to 7½ units and as in the other examples, the viscosity was substantially unaffected.

*Example V*

The purification process carried out in this example was identical to that used in Example IV, but here no acid at all was added to the bleach bath, the pH of the bath being 8.7. Here the final color of the bleached product was 9 on the Hazen scale and the viscosity underwent little change.

As seen from the examples, the bleaching process in accordance with this invention may be carried on under either acid or alkaline conditions and a remarkable improvement in color will result. Also, as seen by the examples, slightly better results will be obtained if the bleaching is carried on under acid conditions.

In the examples, the process in accordance with this invention is carried out by adding the bleach all at once, but it may be carried out by adding the bleach in stages. The latter process particularly recommends itself where excessive contamination of the product makes necessary the addition of larger amounts of bleach. Where a large amount of bleach is required, it may be desirable to first carry out the bleach on the chlorinated rubber in an alkaline state, and then carry out a further bleaching process on the rubber in an acid state.

The mildness of the bleaching treatment in accordance with this invention causes practically no degradation of the chlorinated rubber being treated and has a negligible effect on the viscosity, as shown in the examples. It is only when chlorinated rubbers of extremely high viscosities are treated in accordance with this invention that there is an appreciable drop in viscosity. Even in these cases, the viscosity drop will not be such as to materially affect the properties of the chlorinated rubber.

The method in accordance with this invention applies to chlorinated products made from any of the natural rubbers, such as hevea rubber, balata, gutta percha and the like, and it also applies to chlorinated products made from such synthetic rubbery materials as polymerized chlorobutadiene, polymerized butadiene, rubber hydrochloride, butylene polymers and copolymers, and butadiene derivatives and the like which are unsaturated and capable of chlorination by chlorine, hydrogen chloride or other halogenation agent.

The improvement of the present invention may be applied to chlorinated materials of the character mentioned which have been chlorinated to the point at which they have become saturated by addition of the chlorine, or to the point at which they are incapable of further reaction with chlorine either by addition or by substitution, or to some point intermediate between these two extremes. Thus, for example, it may be applied to the product obtained by chlorinating ordinary (hevea) rubber until it has a chlorine content of about 62%, or until the chlorine content has reached about 70%, or until it has reached an intermediate stage such as in the range between about 65% and about 69%, at which point chlorination is for practical purposes nearly complete.

The bleaching process described in this specification is equally effective in dealing with any halogenated rubber. The description of the process contained in this specification and appended claims has been confined to chlorinated rubber, only for the sake of clarity and brevity. What is said here applies equally well to rubber subjected to the action of other halogens. Thus, an excellent bleach was obtained by applying the process in accordance with this invention to brominated rubber.

During the chlorination of the rubber to be treated in accordance with this invention, any of the methods well known to the art for controlling the viscosity may have been applied. Thus, for example, the chlorination may have been carried out with the addition of air or other oxygen containing media, such as hypochlorites, etc.

The chlorinated rubber to be treated in accordance with this invention may be chlorinated in accordance with any of the well-known chlorinating processes. Thus, any of the solvents commonly employed in the chlorinating may be used. After the rubber has attained the desired chlorine content and before the bleaching is commenced, the product must be removed from its dispersing medium. This removal may be effected either by evaporating the solvent or by precipitating the chlorinated rubber. If the latter of these two methods is employed, any liquid non-solvent for the chlorinated material may be used. The precipitating agents most commonly used are water, wet steam, hexane, heptane, ethyl alcohol, and methyl alcohol.

The actual bleaching of the chlorinated rubber may be brought about by the addition of any hypochlorite or combination of hypochlorites. Thus, for example, sodium, potassium, calcium, and magnesium hypochlorites alone, and in various combinations have been used.

Although the most desirable results are usually obtained by using an amount of hypochlorite which will produce from about 0.1% to about .05% of available chlorine based on the weight of liquid. It may be desirable to have as much as about .4% or as little as about .01%.

The bleaching of the chlorinated rubber in accordance with this invention may be accomplished at temperatures ranging from about 20° C. to about 100° C. but usually the best results will be obtained within the more restricted range of from about 60° C. to about 75° C. The time required for the bleaching will vary with the temperature and other factors. Under some circumstances, ranges from about 10 minutes to about 4 hours may be desirable, but usually the process will require from about 40 minutes to about 2 hours.

Chlorinated rubbers produced in accordance with this invention, because of their extremely light color, good compatibility and stability, particularly recommend themselves for use in coating compositions, such as paints, etc., where a light-colored, scuffproof, tough but flexible, water- and alkali-resistant surface is desired. They also are more useful where clarity of films is a factor as they are reduced in haze content.

In order to obtain the desired color improvement and to avoid severe degradation of the chlorinated rubber, it is essential that the chlorinated rubber be subjected to the bleaching action of the hypochlorite in accordance with this invention after the desired degree of chlorination has been accomplished and after the chlorinated rubber has been separated from the solvents in which the chlorination was accomplished. By waiting until this stage in the chlorination process, greatly increased effectiveness over bleaching at an earlier stage in the chlorination process is realized. During chlorination, the chlorinated rubber has a great affinity for impurities causing discolorations. By carrying out the bleaching action after the rubber has been chlorinated and has been removed from its solvents, the process in accordance with this invention eliminates the possibility that the chlorinated rubber will pick up additional impurities which will tend to darken it again after it has been bleached.

An additional advantage of carrying out the bleaching process in accordance with this invention, after the chlorinated rubber has been removed from its solution, is that the hypochlorite will not have a strong corrosive effect on the metals present in the various chlorinating apparatus. If the hypochlorite is added to the rubber in the presence of the carbon tetrachloride or other solvent which may have been used for the rubber during the chlorination, the hypochlorite will form an emulsion which is extremely corrosive. Such an emulsion can only be handled by expensive, specially constructed equipment.

The Hazen scale for colors referred to herein is that described and compared in Gardner's "Physical and Chemical Examination of Paints, Varnishes, Lacquers and Colors," 1937 edition, especially page 182. Hazen standards below 10 are cobalt-platinum solution; above 10, caramel standards on the same scale (i. e., a color of 20 has twice the intensity of a color of 10, etc.) are used. The entire scale, cobalt-platinum and caramel solutions, is referred to as the Hazen scale.

What I claim and desire to protect by Letters Patent is:

1. In a process for the preparation of a halogen derivative of a rubber selected from the group consisting of natural rubber, polymerized chlorobutadiene, polymerized butadiene, rubber hydrochloride, butylene polymers and butylene copolymers, which comprises reacting such a rubber, dissolved in an organic solvent, with a halogen at least to the point at which unsaturation of the rubber is eliminated and separating the resulting halogenated rubber from its reaction mixture, the steps which comprise subjecting the halogenated rubber, after said separation in the solid state, to an aqueous solution of an inorganic acid of such concentration that the resulting solution after the subsequent addition of a water-soluble hypochlorite is acid, adding said water-soluble hypochlorite in such amount as to make the available chlorine content of said solution equal to from about 0.01% to about 0.4% of the weight of said solution, whereby the halogenated rubber is bleached without substantial degradation, and recovering the bleached halogenated rubber.

2. In a process for the preparation of a halogen derivative of natural rubber, which comprises reacting such a natural rubber, dissolved in an organic solvent, with a halogen at least to the point at which unsaturation of the rubber is eliminated, and separating the resulting halogenated rubber from its reaction mixture, the steps which comprise subjecting the halogenated rubber, after said separation in the solid state, to an aqueous solution of an inorganic acid of such concentration that the resulting solution afer the subsequent addition of a water-soluble hypochlorite is acid, adding said water-soluble hypochlorite in such amount as to make the available chlorine content of said solution equal to from about 0.01% to about 0.4% of the weight of said solution, whereby the halogenated rubber is bleached without substantial degradation, and recovering the bleached halogenated rubber.

3. In a process for the preparation of a chlorinated derivative of a rubber selected from the group consisting of natural rubber, polymerized chlorobutadiene, polymerized butadiene, rubber hydrochloride, butylene polymers and butylene copolymers, which comprises reacting such a rubber, dissolved in an organic solvent with chlorine at least to the point at which unsaturation of the rubber is eliminated, and separating the resulting chlorinated rubber from its reaction mixture, the steps which comprise subjecting the chlorinated rubber, after said separation in the solid state, to an aqueous solution of an inorganic acid of such concentration that the resulting solution after the subsequent addition of a water-soluble hypochlorite is acid, adding said water-soluble hypochlorite in such amount as to make the available chlorine content of said solution equal to from about 0.01% to about 0.4% of the weight of said solution, whereby the chlorinated rubber is bleached without substantial degradation, and recovering the bleached chlorinated rubber.

4. In a process for the preparation of a chlorinated derivative of natural rubber, which comprises reacting such a natural rubber, dissolved in an organic solvent, with chlorine at least to the point at which unsaturation of the rubber is eliminated, and separating the resulting chlorinated rubber from its reaction mixture, the steps which comprise subjecting the chlorinated rubber, after said separation in the solid state, to an aqueous acid solution of a water-soluble hypochlorite of such concentration as to make the available chlorine content of said solution equal to from about 0.01% to about 0.4% of the weight of said solution, for a period of from about 10 minutes to about 4 hours, at a temperature of from about 20° C. to about 100° C., whereby the halogenated rubber is bleached without substantial degradation, and then recovering the bleached chlorinated rubber.

5. In a process for the preparation of a chlorinated derivative of natural rubber, which comprises reacting such a natural rubber, dissolved in an organic solvent, with chlorine at least to the point at which unsaturation of the rubber is eliminated, and separating the resulting chlorinated rubber from its reaction mixture, the steps which comprise subjecting the chlorinated rubber, after said separation in the solid state, to an aqueous solution of hydrochloric acid of such concentration that the resulting solution after the subsequent addition of a water-soluble hypochlorite is acid, adding said water-soluble hypochlorite in such amount as to make the available chlorine content of said solution equal to from about 0.01% to about 0.4% of the weight of said solution, whereby the chlorinated rubber is bleached without substantial degradation, and recovering the bleached chlorinated rubber.

6. In a process for the preparation of a halogen derivative of a rubber selected from the group consisting of natural rubber, polymerized chlorobutadiene, polymerized butadiene, rubber hydrochloride, butylene polymers and butylene copolymers, which comprises reacting such a rubber, dissolved in an organic solvent, with a halogen at least to the point at which unsaturation of the rubber is eliminated, and separating the resulting halogenated rubber from its reaction mixture, the steps which comprise subjecting the halogenated rubber, after said separation in the solid state, to an aqueous acid solution of a water-soluble hypochlorite of such concentration as to make the available chlorine content of the solution equal to from about 0.01% to about 0.4% of the weight of said solution, whereby the halogenated rubber is bleached without substantial degradation, and then recovering the bleached halogenated rubber.

7. In a process for the preparation of a chlorinated derivative of natural rubber, which comprises reacting such a natural rubber, dissolved in an organic solvent, with chlorine at least to the point at which unsaturation of the rubber is eliminated, and separating the resulting chlorinated rubber from its reaction mixture, the steps which comprise subjecting the chlorinated rubber, after said separation in the solid state, to an aqueous acid solution of a water-soluble hypochlorite of such concentration as to make the available chlorine content of said solution equal to from about 0.01% to about 0.4% of the weight of said solution, whereby the halogenated rubber is bleached without substantial degradation, and then recovering the bleached chlorinated rubber.

FREDERICK JAMES BOUCHARD.